April 5, 1927.  
W. LOEFFLER  
MORTISING MACHINE  
Filed Nov. 15, 1924  
1,623,626  
5 Sheets-Sheet 1
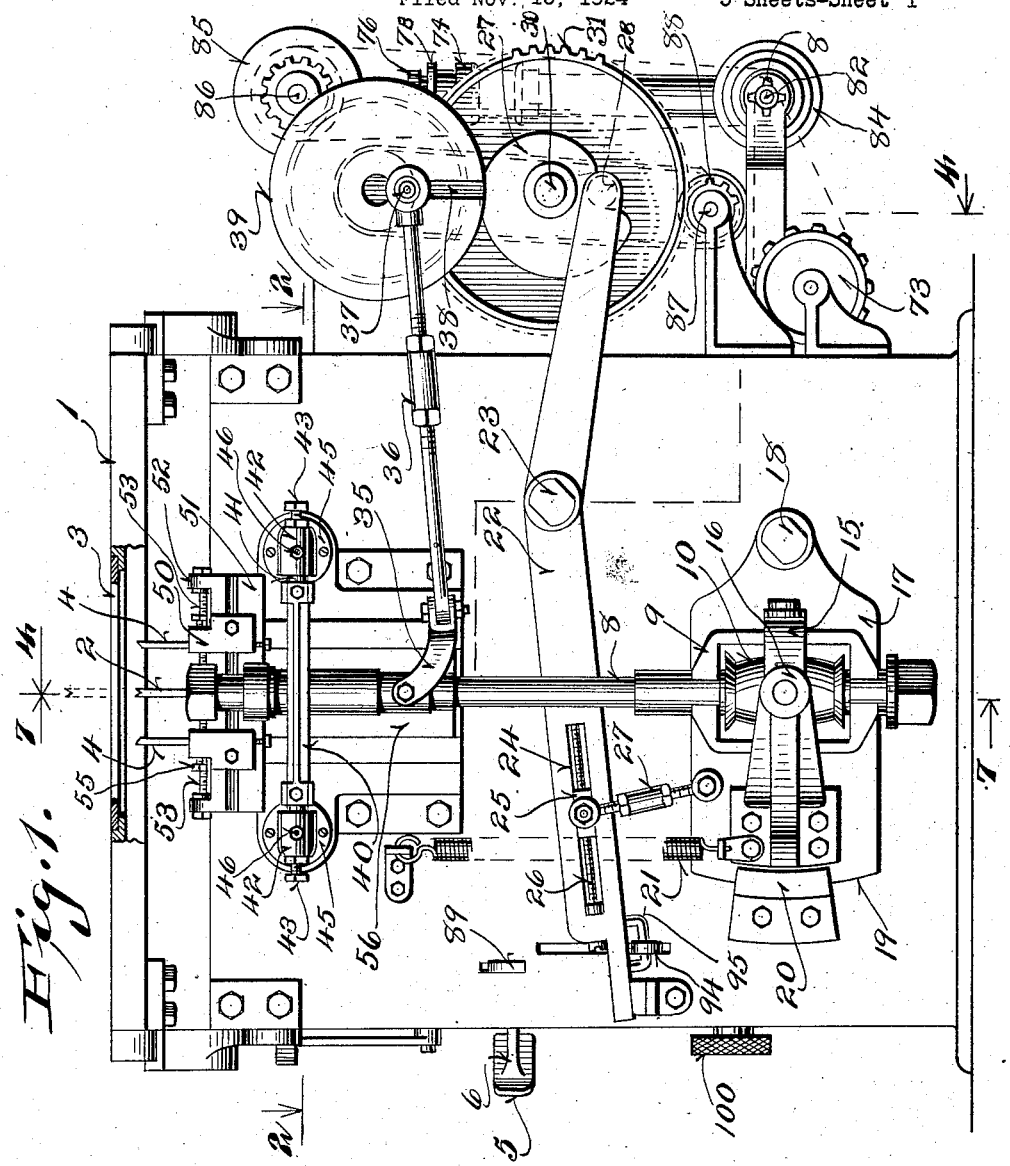
Inventor  
William Loeffler

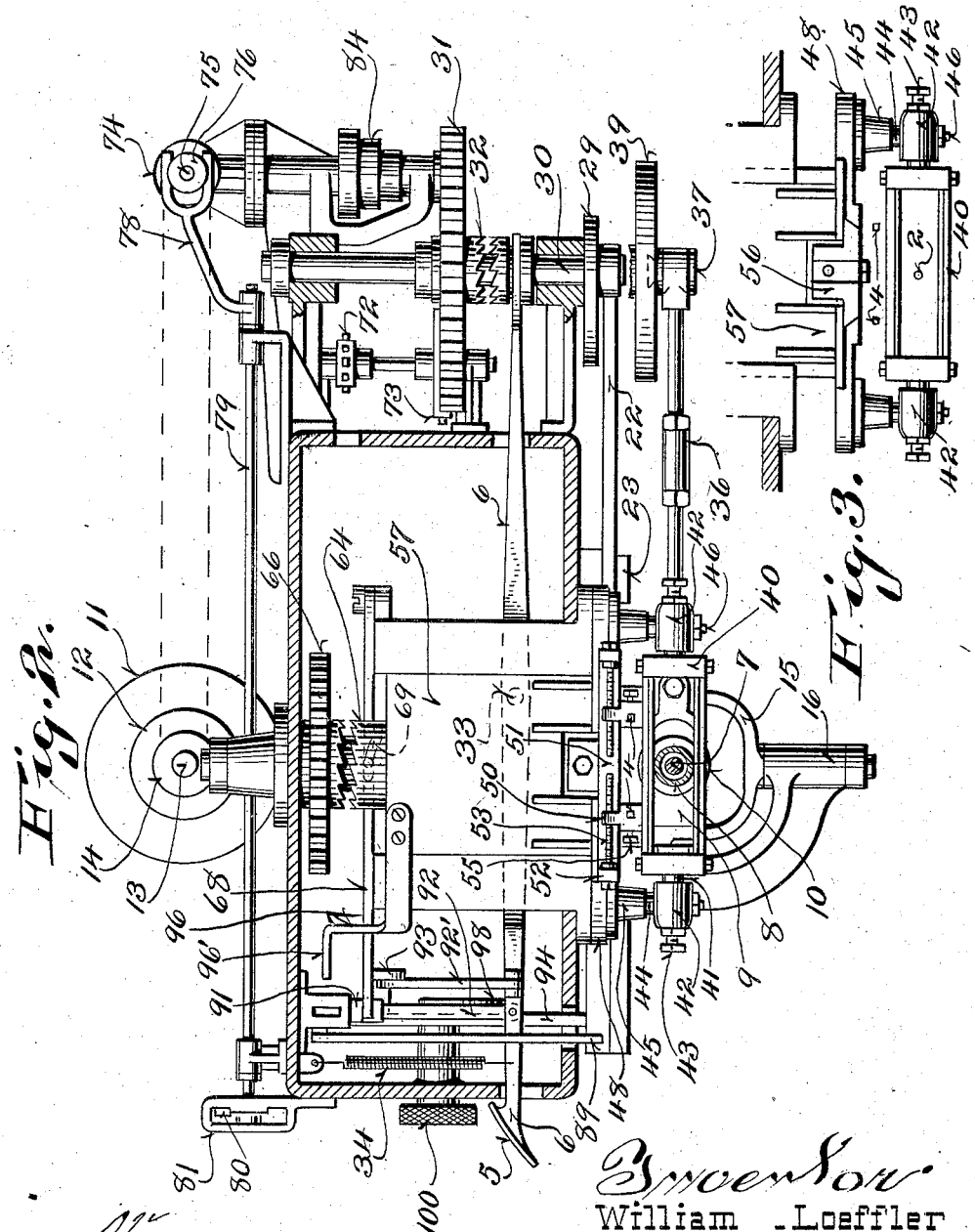

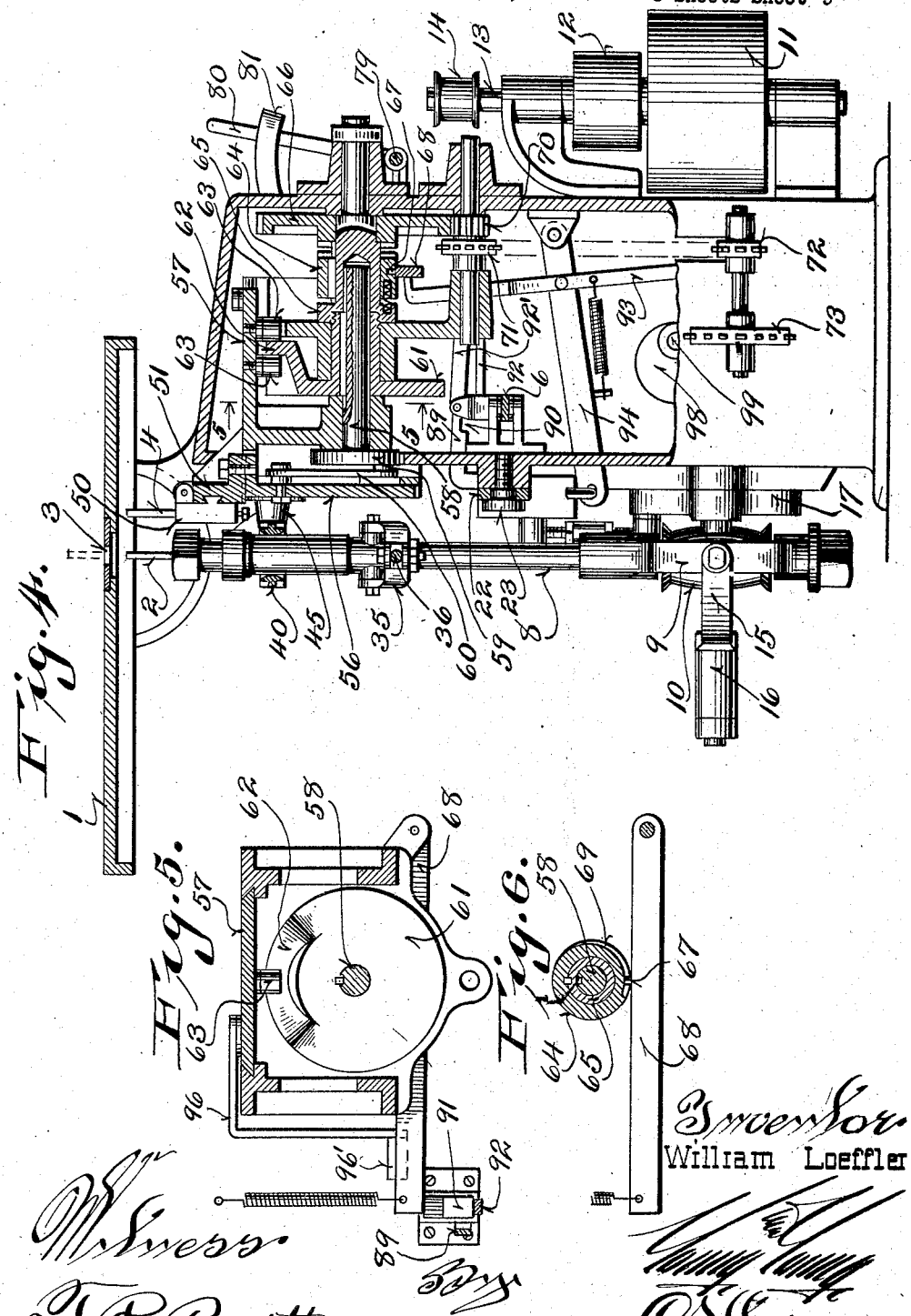

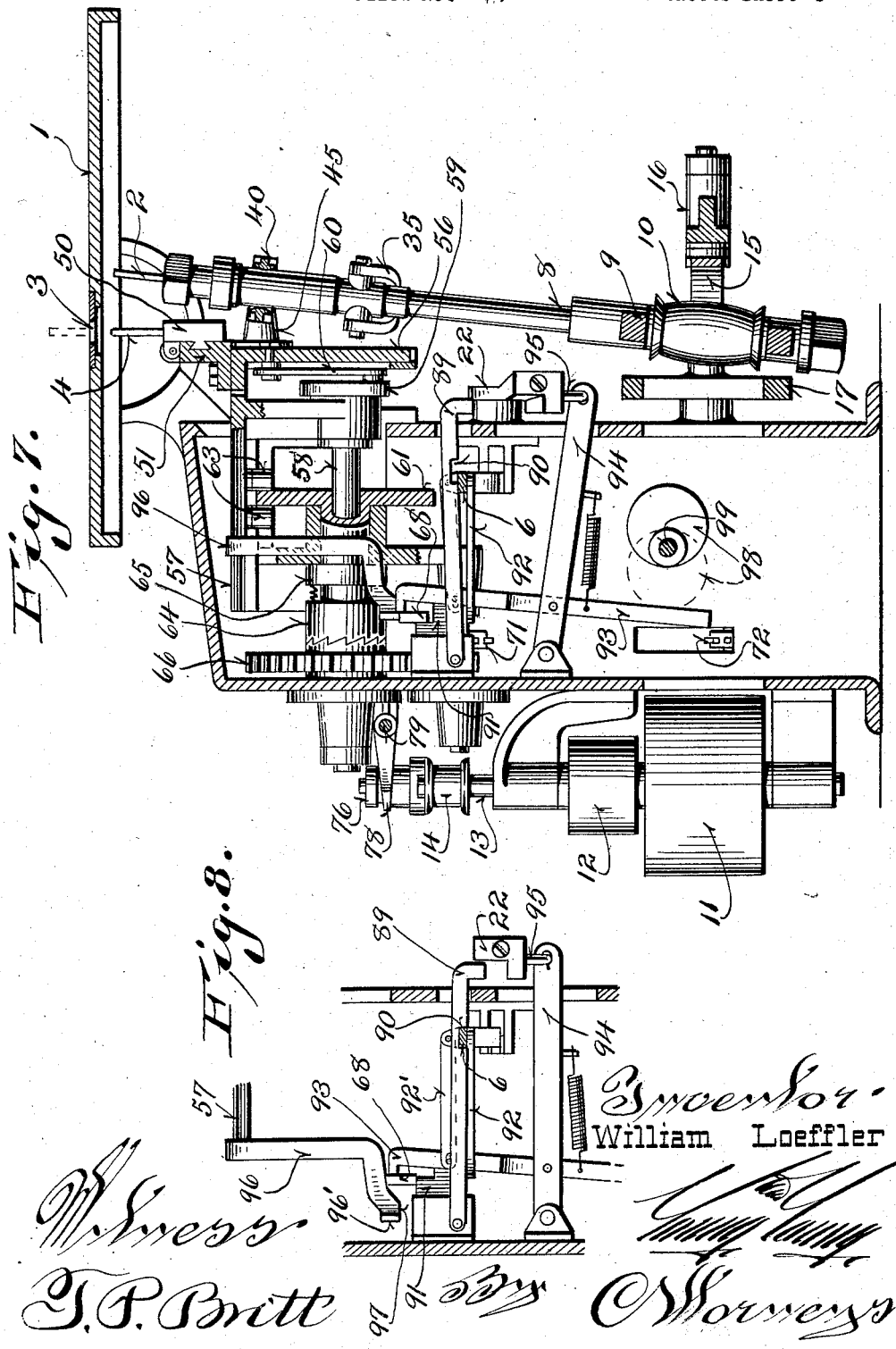

April 5, 1927.

W. LOEFFLER

MORTISING MACHINE

Filed Nov. 15, 1924   5 Sheets-Sheet 5

Inventor
William Loeffler

Patented Apr. 5, 1927.

1,623,626

UNITED STATES PATENT OFFICE.

WILLIAM LOEFFLER, OF SHEBOYGAN, WISCONSIN.

MORTISING MACHINE.

Application filed November 15, 1924. Serial No. 750,147.

This invention relates to mortising machines and is in general an improvement over the invention disclosed in my copending application, Serial Number 659,322, filed August 25, 1923, for mortising machines.

Objects of this invention are to provide a mortising machine which will form mortises with the greatest accuracy and will produce square corners, in which no changing of the work is required between the forming of the mortise and the squaring of the corners or ends, and to provide a machine eminently adapted for quantity production which does not depend upon the judgment or skill of the operator, but may be manipulated by an unskilled laborer.

Further objects are to provide a mortising machine which is very rapid in its operation, which will use any type of guide and thus will form straight or curved mortises, which will automatically feed the tool, and thereafter feed the chisels into the work to form the square ends, and finally will automatically stop the machine after a complete cycle of operation.

Further objects are to provide a mortising machine which is adjustable for length, depth and shape, of the mortise, in which the adjustments may be easily and rapidly made, and in which the most accurate relative adjustment of the chisels and mortising tool may be rapidly made.

Further objects are to provide a mortising machine in which the mechanism for forming the square ends may be temporarily rendered inoperative at the will of the operator, so that the machine may be set either to form square ended mortises or round ended mortises of any desired length, shape and depth.

Further objects are to provide a mortising machine which is substantial and sturdy in construction, which is extremely simple, and which has relatively few parts in comparison to the complicated nature of the operations performed.

An embodiment of the invention is shown in the accompanying drawings, in which:—

Figure 1 is a front elevation of the machine with a portion of the table broken away.

Figure 2 is a sectional view on the line 2—2 of Figure 1.

Figure 3 is a fragmentary detail of the guide for the mortising tool.

Figure 4 is a sectional view corresponding approximately to a section on the line 4—4 of Figure 1.

Figure 5 is a sectional view on the line 5—5 of Figure 4.

Figure 6 is a fragmentary detail showing the control means for the chisel advancing mechanism.

Figure 7 is a sectional view approximately on the line 7—7 of Figure 1.

Figure 8 is a diagrammatic view of the control levers for the chisel advancing mechanism and for the control of the mortising tool advancing means.

Figure 9:
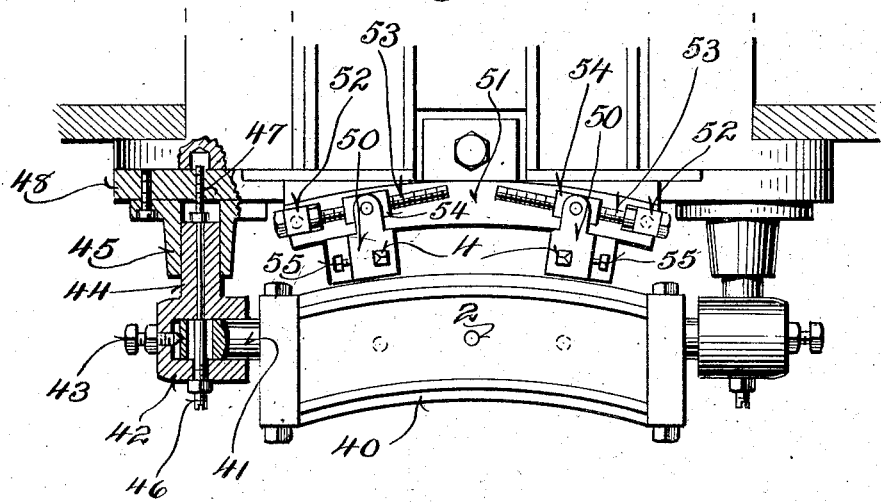
Figure 9 is a fragmentary detail on an enlarged scale showing a curved guide and showing the adjustable mechanism for the guide and for the chisels.

Before entering into the detailed description of the mechanism, the general operation of the machine will be developed. The work of whatever class desired is held either directly to the table 1 or else in suitable clamps, as disclosed in my copending application, and the table is adjusted to the desired angularity. Thereafter, the machine is set in operation and the revoluble mortising tool 2 is fed upwardly through the throat plate 3 into the wood.

This tool, while it is rapidly revolved, is also oscillated back and forth and is relatively slowly advanced into the work. After the tool has completed its work, it drops downwardly and such tool and a pair of chisels 4 are rocked forwardly, the chisels originally occupying an inoperative position beneath the table top. After the tool 2 and the chisel 4 have been moved forwardly and the chisels automatically aligned with the mortise, mechanism is automatically set in operation which forces the chisels into the work and thus squares the ends of the mortise. Thereafter, the chisels 4 and tool 2 are rocked into their original positions and the machine is automatically stopped. The cycle of operation is again initiated by the operator's pressing against the control plate 5 carried by the control lever 6, as may be seen from Figure 1. With this brief description of the general operation of the machine, the detailed description will be undertaken.

The mortising tool 2 is adjustably carried by the upper end of a rotary spindle 7 (see Figure 2) which is carried within a housing 8, such housing being rigid with the frame 9 of the universal joint at the lower end of the mechanism, as may be seen from Figures 1 and 4. This frame is cut away to provide an opening for the pulley 10 carried by the spindle 7, such pulley being belted to the relatively large pulley 11 (see Figures 2 and 4) mounted upon the rear side of the machine. The pulley 11 may be driven in any suitable manner as by means of a smaller pulley 12 mounted upon its shaft 13,—it being noted that a smaller pulley 14 (see Figure 4) is rigidly carried by such shaft for a purpose hereinafter to appear.

Returning to the universal mounting of the housing 8, it will be seen that the frame 9 is pivotally carried within an enclosing fork-like frame 15 which in turn is pivoted within an arm 16 rigidly bolted to the feed plate 17. This feed plate is pivoted, as indicated at 18, (see Figure 1) and is provided with a curved outer face 19 held by a curved guide 20. If desired, a spring 21 may be secured to the plate and to a stationary portion of the machine, as shown in Figure 1, to sustain a portion of the weight of such plate.

The means for advancing the feed plate 17 and thus feeding the tool 2 into the work comprises a lever 22 pivoted at 23 to the front of the machine and provided with a slot 24. A small crosshead 25 is adjustably located within said slot and set in its adjusted position by means of the elongated screw 26. This crosshead is connected by means of an adjustable link 27 with the plate 17 and thus motion of the lever 22 is transmitted to such plate and from thence to the tool 2. The other end of the lever is provided with a cam follower or roller 28 which cooperates with a cam 29. It is to be noted that this cam is rigidly mounted upon a shaft 30. This shaft loosely carries a large gear wheel 31. Clutch members 32 are carried by the gear 31 and the shaft and are operated by the control lever 6, such lever being pivoted intermediate its ends, as indicated in dotted lines at 33 in Figure 2.

A spring 34 (see Figure 2) is connected to the lever 6 and urges such lever towards clutch open position.

The means for oscillating the tool 2 comprises a forked member 35 (see Figure 1) pivoted to the housing 8 and also pivoted to an adjustable link 36. This link has at its outer end a crank pin 37 adjustably mounted within a slot 38 formed in the disk or rotating plate 39.

The upper end of the housing 8 for the tool is guided in a frame 40 (see Figures 1, 2, 4, 7 and 9). This frame 40 is provided with trunnions 41 (see Figure 9) which are guided by bearings 42. These bearings 42 are provided with screws 43 threaded into their end and equipped with lock nuts for controlling the position of the slide in its sidewise adjustment. The bearings 42 are provided with cylindrical rearwardly projecting shanks 44 which fit within guiding supporting members 45 secured to the casing of plate 48, as clearly shown in Figure 9. A screw 46 extends through the bearings and is provided with an enlarged outer end and with a smaller threaded shank 47. This threaded shank is screwed into the plate 48 which supports the chisels and the guide for the tool. Thus when the screws 46 are adjusted the spacing of the bearings 42 towards and from the plate 48 is controlled and a very accurate adjustment is secured. It is to be noted that the trunnions 41 are provided with relatively large apertures through which the screws 46 pass so as not to interfere with the free rocking of the guide 40.

From reference to Figure 9, it will be seen that a pair of chisels 4 are mounted in chisel guides 50 which travel upon an arcuate guide strip or member 51 carried by the plate 48. The guide 51 is provided with upstanding lugs 52 adjacent its ends which revolubly carry screws 53, such screws being held against lateral shifting. These screws are threaded into nuts 54 pivotally carried by the chisel holders 50, and the chisels themselves are held removably within their holders by means of set screws 55 or similar members. Thus the spacing of the chisels may be most accurately controlled by this means, and the exact relative positioning of the chisels and of the tool 2 may be controlled by the adjustment of the screws 46 and 53.

It is to be particularly noted that the guide 51 is removably secured to the vertically oscillatable chisel carrying slide 56, as may be clearly seen from Figures 4 and 7.

A horizontally reciprocable tool carriage 57 carries the slide 51 and the plate 48 and the tool guide 40, as may be seen from Figures 4 and 7. This carriage is provided with a shaft 58 equipped with a crank 59 which, by means of the pitman 60, is adapted to reciprocate the chisels 4, as may be seen from Figures 4 and 7. The shaft 58 is keyed to a disk cam 61 (see Figure 4) and such disk cam is provided with an offset portion 62 for holding the carriage in retracted position, as shown in Figure 4, although, as may be seen from Figure 5, such disk cam is provided with a flat face throughout the main portion of its extent, so that throughout the major portion of the rotation of the shaft 58, the carriage will be in its outermost position with the chisels 4 positioned in alignment with the slot 3 in the throat plate of the table 1. A convenient way of connecting the carriage 57 with the cam is by means of a pair of rollers 63 positioned on opposite sides of the cam.

The shaft 58 is normally inoperative throughout the major portion of the cycle of operations of the machine and is controlled by means of a movable clutch member 64 splined to a member 65 rigid with the hub of the cam 61, as may be seen from Figure 4. This clutch member is adapted, under certain conditions, to cooperate with corresponding teeth formed upon the relatively large gear 66 revolubly mounted upon the hub of the member 65. The clutch is spring pressed towards closed position, as may be seen from Figure 4, and is held in its retracted position by means of a pin 67 carried by a lever 68 which fits within a spiral groove 69 formed in the clutch member 64, as may be clearly seen from Figures 2, 4 and 6. The gear 66, it will be noted is driven by means of a pinion 70 rigid with a sprocket wheel 71 which is driven from a lower sprocket wheel 72, such lower sprocket wheel being carried upon a jack shaft which in turn is driven by a sprocket wheel 73. The drive for the sprocket wheel 73 will be described hereinafter.

It will be noted from Figure 2 that the pulley 14 on the main driven shaft which carries the driving pulley 12 is belted to a pulley 74 loosely mounted upon a shaft 75. This pulley is connected rigidly with the shaft by means of any suitable type of clutch member 76 operated by a forked rock arm 78 carried upon the rock shaft 79. This rock shaft may be controlled by means of a lever 80 at one end of the machine, as shown in Figure 4, such lever fitting in suitable notches formed in a guide 81 to hold the clutch member in either of its two positions.

The shaft 75 extends vertically downwardly and is connected by means of bevel gears not shown, with the shaft 82 (see Figure 1). This shaft 82 carries a small sprocket wheel 83 which is connected by a suitable chain with the sprocket wheel 73 previously described, and from this sprocket wheel through the mechanism previously described, with the gear 66 (see Figure 4). The shaft 82 also carries a set of cone pulleys 84 which are belted to cone pulleys 85 upon an upper jack shaft 86. This last jack shaft is connected by means of suitable gearing with the crank disk 39 (see Figure 1). Motion is transmitted from this point by means of belts and pulleys to a lower jack shaft 87 equipped with a small pinion 88. This pinion meshes with the gear 31 for operating the cam shaft 30 through the medium of the clutch members 32 (see Figures 1 and 2). The control means for the tool 2 and chisels 4 includes mechanism for controlling the operation of the clutch members 32 and 64 (see Figure 2) so that the correct sequence of operations will be performed. This control means consists of a latch lever 89 (see Figures 1, 2, 7 and 8). This latch lever is provided with a notch 90 which receives the clutch lever 6 (see Figure 8) and thus locks the clutch lever in clutch closing position.

The lever 89, it will be noted, has a downwardly extending portion adapted to contact with a portion of the operating lever 22 for the feed plate 17 (see Figures 1 and 8). Thus when the feed plate 17 passes to its uppermost position when rocked by the cam 29, it will trip the latch lever 89 and release the lever 6 from the latching effect of this latch lever. However, the clutch lever 6 will be held against motion by the frictional engagement of the clutch members 32 while the cam 29 is still loaded. However, at the instant that the roller 28 snaps downwardly over the projecting portion of the cam, the load is temporarily removed from the cam, and the clutch members 32 disengage under the influence of the spring 34, as may be appreciated from an inspection of Figures 1 and 2. Thus the tool advancing means is stopped after the tool has completed its work.

The means for causing the outward motion of the carriage 57 (see Figure 4) which carries the tool 2 and chisels 4, is controlled by means of the clutch 64, which in turn is controlled by means of the lever 68 (see Figures 4, 2 and 8). This lever is held against inadvertant downward motion by means of a notched block 91 which is connected by means of a link 92 with the shift lever 6, as may be seen from Figures 8 and 2. When the shift lever 6 is thrown to clutch open position, the notched block 91 will be moved from below the lever 68. The means for retracting or rocking the lever 68 downwardly (see Figures 2, 7 and 8) comprises a hooked lever 93 pivotally carried by a lever 94. The free end of this lever 94 is connected by means of a staple like member 95 with the lever 22 (see Figures 1 and 8) and is spring urged in a counter-clockwise direction, as may be seen from Figures 7 and 8. When the lever 94 is rocked upwardly, as the lever 22 is rocked in a counterclockwise direction by means of cam 29 (see Figure 1), the hooked end of the lever 93 slips over the lever 68. Thus when the lever 22 moves in a counterclockwise direction upon being released by the cam 29 (see Figure 1), the lever 94 is moved downwardly and thus carries the hooked lever 93 with it. This in turn draws the lever 68 downwardly and thus releases the clutch member 64 as the pin 67 is drawn downwardly out of the slot 69 (see Figures 4 and 6). The clutch member 64 immediately moves to the right in Figure 4 and locks to the gear 66. This gear is constantly rotating and thus rotates the cam 61 and projects the carriage 57 outwardly thus moving the tool or cutter 2 outwardly and positioning the chisels 4 below the slot 3 in the throat plate (see Figures 4 and 7). Continued rotation causes the crank 59 (see Figure 4) to oscillate the reciprocal slide 56 of the chisels and to project the chisels into the work. When the chisels are retracted, the depressed portion 62 of the cam draws the carriage 57 back into its initial position.

It is to be noted from Figures 2, 7 and 8 that the carriage is provided with a downwardly and outwardly extending arm 96. This arm 96 is bodily carried forwardly by means of the carriage 57 and its projecting arm 96' thus engages the upper end of the hooked lever 93 and slides the hook off of the lever 68. However, this lever 68 is held downwardly by means of the flat face 97 of the lever 96, as may be seen from Figures 7 and 8. Upon retraction of the carriage 57 into the position shown in Figures 2 and 8, the lever 68 is allowed to rock upwardly under the influence of its spring and to again project the pin 67 (see Figure 6) into the helical slot 69 of the clutch member 64. Due to the helical nature of this slot, the clutch member 64 is retracted and interrupts the driving from the gear 66 and thus stops the operation of the carriage and chisels when they are in retracted position. It will be seen that both clutches are now open and the operative functions of the machine have been completely stopped at the end of one complete cycle of operation.

In order to initiate another cycle of operations, it is merely necessary for the operator to shift the lever 6 by pressing against the bearing plate 5 (see Figures 1 and 2) thus closing the clutch 32. The cycle of operations is again started and the machine goes through a complete set of operations and is again automatically stopped, as previously described.

As a precautionary measure, a link 92' (see Figure 8) is provided which connects the lever 93 with the shift lever 6. By this construction, the lever 93 is always moved to unlatching position whenever the shift lever 6 may be moved. Under normal conditions, there is no necessity for this additional precaution, but if through tampering the lever 93 shall be left hooked over the lever 68, no damage would be done for the reason that as soon as the clutch lever 6 was shifted, it would immediately unlatch the lever 93 and allow the lever 68 to move upwardly.

It may be found desirable under certain conditions to throw the chisel operating mechanism completely out of commission. This is accomplished by means of a cam 98 (see Figure 7) carried upon a longitudinally extending shaft 99 which projects outwardly through the casing of the machine and is provided with a manipulating knurled hand wheel 100 (see Figures 1 and 2). The cam 98 is positioned in line with the lower end of the hooked lever 93 (see Figures 7 and 8) and when moved into the dotted line position, as shown in Figure 7, it will contact with the lower end of the lever and prevent the hooked end thereof from engaging over the top of the lever 68. Thus the lever 68 will not be retracted and consequently the pin 67 (see Figure 6) will remain in the spiral groove 69 and will thus hold the clutch member 64 in inoperative position.

Figure 10:
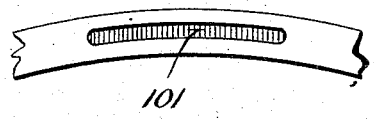
Figures 10 and 11 show respectively a round ended and a square ended curved mortise illustrating types of work performed by the machine.
Figure 11:

It will thus be seen that a mortising machine has been provided which is power driven, and which will form in an automatic manner a mortise of any desired contour either straight or arcuate, as shown in Figures 10 and 11. Also it will be seen that either a round ended mortise, as shown in Figure 10 at 101, or a square ended mortise shown at 102 in Figure 11, may be formed in a wholly automatic manner.

It is to be distinctly understood that any type of guide 40 for controlling the tool, and any type of guide 51 for controlling the chisels, as shown in Figure 9, may be employed, and thus the desired contour of the mortise may be controlled. Further, the length of the mortise may easily be controlled by moving the adjustable crank pin 37 (see Figure 1) radially with regard to the crank disk 39 and correspondingly shifting the chisels by means of the screws 53 (see Figure 9). Further, the depth of the mortise may be controlled by shifting the crosshead 25 within the slot in the lever 22 (see Figure 1) and accordingly shifting the chisels 4 upwardly or downwardly, such chisels being held by set screws 55 and adjusted in any conventional manner, as indicated in Figure 4.

It will, therefore, be seen that a mortising machine has been provided which, although performing a very complicated series of operations in a wholly automatic manner, is nevertheless of simple and strong construction and free from delicate fragile parts.

Although the invention has been described in considerable detail, it is to be understood that the invention may be variously embodied and is, therefore, to be limited only as claimed.

I claim:

1. An automatic mortising machine comprising means for holding the work stationary during the complete automatic operation of the machine, a cutter, means for operating said cutter and feeding it into the work to form a mortise, and means adapted to enter the mortise and square the ends thereof after the cutter has been withdrawn.

2. An automatic mortising machine comprising a cutter, means for feeding said cutter into the work to form a mortise, a cutting member for squaring the ends of the mortise, means for projecting the cutting member into the mortise after the cutter has completely functioned, and stop mechanism for arresting the operation of the machine after the cutting means has functioned.

3. An automatic mortising machine comprising a cutter, means for feeding said cutter into the work to form a mortise, a cutting member for squaring the ends of the mortise, means for projecting the cutting member into the mortise after the cutter has functioned, stop mechanism for arresting the operation of the machine after the cutting means has functioned, and manually controlled means for initiating the cycle of operation of the machine.

4. A mortising machine comprising a cutter and chisels, a carriage for said cutter and chisels, automatic mechanism for controlling the position of said carriage, and automatic means for causing the sequential operation of said cutter and chisels.

5. A mortising machine comprising a rotary cutter, means for rotating said cutter, automatic mechanism for oscillating said cutter and feeding into the work to form a mortise, a pair of spaced chisels, and automatic means functioning after the feeding of the cutter for forcing said chisels into said mortise adjacent the ends of such mortise to square such ends.

6. A mortising machine comprising a rotary cutter, means for driving said cutter, a pair of spaced chisels, means for oscillating said chisels, a carriage for said cutter and chisels, and automatic means for controlling the position of said carriage and for successively moving said cutter and chisels into the work, the means for moving said chisels operating only after the cutter has been completely withdrawn.

7. A mortising machine comprising a rotary cutter, means for driving said cutter, a pair of spaced chisels, means for oscillating said chisels, a carriage for said cutter and chisels, automatic means for controlling the position of said carriage and for successively moving said cutter and chisels into the work, said second mentioned means operating to move the chisels into the work only after the cutter has been withdrawn, and means for automatically stopping said machine after the cutter and chisel have both operated and for permitting the manual starting of the machine.

8. In a mortising machine, the combination of a rotary cutter and a chisel, a carriage carrying said cutter and chisel, a cam for advancing said carriage, and a shaft splined to said cam and having a crank connected with said chisel, whereby when said carriage is advanced said chisel is projected into the work.

9. In a mortising machine, the combination of a rotary cutter and a chisel, a carriage carrying said cutter and chisel, a cam for advancing said carriage, a shaft splined to said cam and having a crank connected to said chisel, and automatic means for controlling the feeding of said cutter and the operation of said cam.

10. In a mortising machine, the combination of a rotary cutter and a chisel, a carriage carrying said cutter and chisel, a cam for advancing said carriage, a shaft splined to said cam and having a crank connected to said chisel, automatic means for controlling the feeding of said cutter and the operation of said chisel, and means for automatically stopping the machine after each cycle of operations.

11. A mortising machine comprising a rotary cutter, means for rotating and oscillating said cutter, a cam for advancing said cutter, a clutch for controlling said cam, a pair of spaced chisels adapted to enter the work after the cutter has operated, a carriage for said cutter and chisels, a cam for advancing said carriage, and means for projecting said chisels into the work after said carriage has been advanced.

12. A mortising machine comprising a rotary cutter, means for rotating and oscillating said cutter, a cam for advancing said cutter, a clutch for controlling said cam, a pair of spaced chisels adapted to enter the work after the cutter has operated, a carriage for said cutter and chisels, a cam for advancing said carriage, means for projecting said chisels into the work after said carriage has been advanced, and means for opening said clutch before the advancing of said carriage.

13. A mortising machine comprising stationary means for holding the work, a cutter and a pair of spaced chisels, a carriage for said cutter and chisels, means for advancing said cutter, means for successively operating said cutter and said chisels, said last mentioned means projecting said chisels into the work after said cutter has been completely withdrawn, and means for adjusting the relative position of said cutter and chisels.

In testimony that I claim the foregoing I have hereunto set my hand at Sheboygan, in the county of Sheboygan and State of Wisconsin.

WILLIAM LOEFFLER.